United States Patent
Shah et al.

(10) Patent No.: US 10,760,404 B2
(45) Date of Patent: Sep. 1, 2020

(54) CONDUIT MAPPING TOOL AND METHOD

(71) Applicant: Schlumberger Technology Corporation, Sugar Land, TX (US)

(72) Inventors: Chintankumar Bharatkumar Shah, Shanghai (CN); Jiawei Dong, Houston, TX (US); Jason Keith Jonas, Missouri City, TX (US); E-Kiang Soh, Shanghai (CN); Maxim Pushkarev, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 197 days.

(21) Appl. No.: 15/835,511

(22) Filed: Dec. 8, 2017

(65) Prior Publication Data
US 2018/0163529 A1 Jun. 14, 2018

Related U.S. Application Data

(60) Provisional application No. 62/431,577, filed on Dec. 8, 2016.

(51) Int. Cl.
| | |
|---|---|
| *E21B 47/00* | (2012.01) |
| *E21B 37/02* | (2006.01) |
| *G01B 11/00* | (2006.01) |
| *G01B 11/24* | (2006.01) |

(52) U.S. Cl.
CPC .......... *E21B 47/0002* (2013.01); *E21B 37/02* (2013.01); *E21B 47/00* (2013.01); *G01B 11/00* (2013.01); *G01B 11/24* (2013.01)

(58) Field of Classification Search
CPC ...... E21B 47/0002; E21B 37/02; E21B 47/00; G01B 11/24; G01B 11/00
See application file for complete search history.

(56) References Cited

U.S. PATENT DOCUMENTS

| | | | |
|---|---|---|---|
| 5,502,686 A * | 3/1996 | Dory | G01V 11/00 367/34 |
| 2009/0086575 A1* | 4/2009 | Tello | E21B 47/0005 367/35 |
| 2012/0169841 A1* | 7/2012 | Chemali | E21B 47/0002 348/36 |
| 2012/0211649 A1* | 8/2012 | Hallundbæk | E21B 47/102 250/267 |
| 2012/0217009 A1* | 8/2012 | Hallundbæk | E21B 47/0905 166/255.2 |
| 2014/0278111 A1* | 9/2014 | Gerrie | E21B 47/0002 702/8 |
| 2014/0336937 A1* | 11/2014 | Hallundbæk | E21B 47/0002 702/8 |

(Continued)

*Primary Examiner* — Michael R Wills, III

(57) ABSTRACT

An apparatus, system, and method for mapping a conduit wall, of which the apparatus includes a shaft defining a central longitudinal axis, and a sensor module coupled to the shaft and including an emitter configured to emit a light beam directed at least partially radially with respect to the central longitudinal axis, and a sensor configured to detect a reflected portion of the light beam, such that the sensor module is configured to measure a distance between the conduit wall and sensor module. The apparatus also includes a centralizer coupled to the shaft and configured to position the sensor module at a center of the conduit.

20 Claims, 9 Drawing Sheets

(56) References Cited

U.S. PATENT DOCUMENTS

| | | | |
|---|---|---|---|
| 2016/0032717 A1* | 2/2016 | Parker | E21B 47/01 |
| | | | 367/7 |
| 2016/0282504 A1* | 9/2016 | Wilson | E21B 47/0006 |
| 2018/0266243 A1* | 9/2018 | Malik | B06B 1/0633 |
| 2019/0111498 A1* | 4/2019 | Fitzgerald | B23B 29/03446 |

* cited by examiner

CONDUIT MAPPING TOOL AND METHOD

CROSS-REFERENCE TO RELATED APPLICATIONS

This application claims priority to U.S. Provisional patent application having Ser. No. 62/431,577, which was filed on Dec. 8, 2016, and is incorporated herein by reference in its entirety.

BACKGROUND

Pipes and drill collars, among other types of generally tubular conduits, are used in the drilling of oil and gas wells. It may be useful to know the precise measurements of such pipes and drill collars, including the overall profiles and dimensions of conduits extending through the pipes and drill collars. However, it may be difficult to measure dimensions within such conduits, at least in part because they may be long and narrow, making it difficult for measuring equipment to obtain measurements, particularly near the center of the conduit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the disclosure may provide an apparatus for mapping a conduit wall. The apparatus includes a shaft defining a central longitudinal axis, and a sensor module coupled to the shaft and including an emitter configured to emit a light beam directed at least partially radially with respect to the central longitudinal axis, and a sensor configured to detect a reflected portion of the light beam, such that the sensor module is configured to measure a distance between the conduit wall and sensor module. The apparatus also includes a centralizer coupled to the shaft and configured to position the sensor module at a center of the conduit.

Embodiments of the disclosure may further provide a system for forming and mapping a conduit wall. The system includes an elongate shaft having a proximal end, a distal end, and a central longitudinal axis extending from the proximal end to the distal end, a bore head coupled to the distal end of the elongate shaft, and a sensor module coupled to the elongate shaft. The sensor module includes a laser device oriented so as to emit a laser beam that extends radially away from the central longitudinal axis, and the sensor module including a photodetector oriented to receive at least a reflected portion of the laser beam.

Embodiments of the disclosure may also provide a method of mapping a conduit. The method includes moving a mapping tool at least partially in the conduit, the mapping tool including a shaft defining a central longitudinal axis, a sensor module coupled to the shaft, the sensor module including a laser emitter and a photodetector, and a centralizer coupled to the shaft and configured to position the sensor module at a center of the conduit. The method also includes generating a laser beam using the laser emitter. The laser beam is directed toward an inner surface of the conduit. The method also includes receiving at least a portion of the laser beam reflected by the inner surface of the conduit at the photodetector, and determining a distance between the sensor module and the inner surface of the conduit based on a property of the laser beam.

BRIEF DESCRIPTION OF THE DRAWINGS

In the drawings, sizes, shapes, and relative positions of elements are not drawn to scale. For example, the shapes of various elements and angles are not drawn to scale, and some of these elements may have been arbitrarily enlarged and positioned to improve drawing legibility.

DETAILED DESCRIPTION

Reference will now be made in detail to embodiments, examples of which are illustrated in the accompanying figures. In the following detailed description, numerous specific details are set forth in order to provide a thorough understanding of the present disclosure. However, it will be apparent to one of ordinary skill in the art that the system and method disclosed herein may be practiced without these specific details.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members." Further, the word "or" is intended to be constructed in its non-exclusive sense; that is, "A or B" should be interpreted to mean A, B, or both A and B.

Figure 1A:
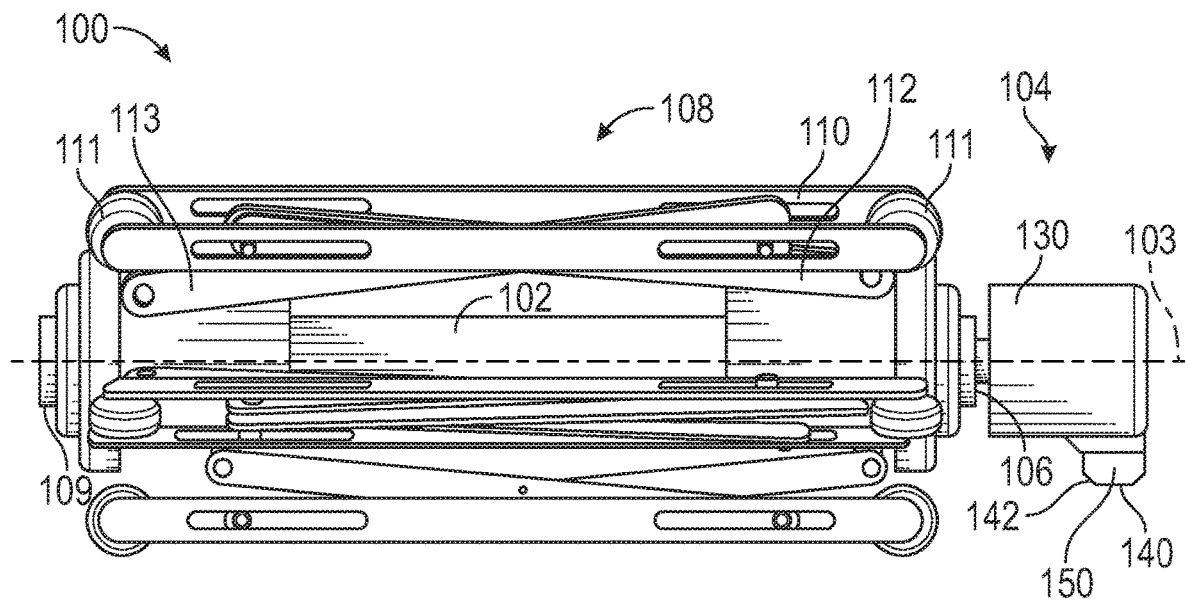
FIG. 1A illustrates a side view of a conduit mapping tool in a collapsed configuration, according to an embodiment.
Figure 1B:
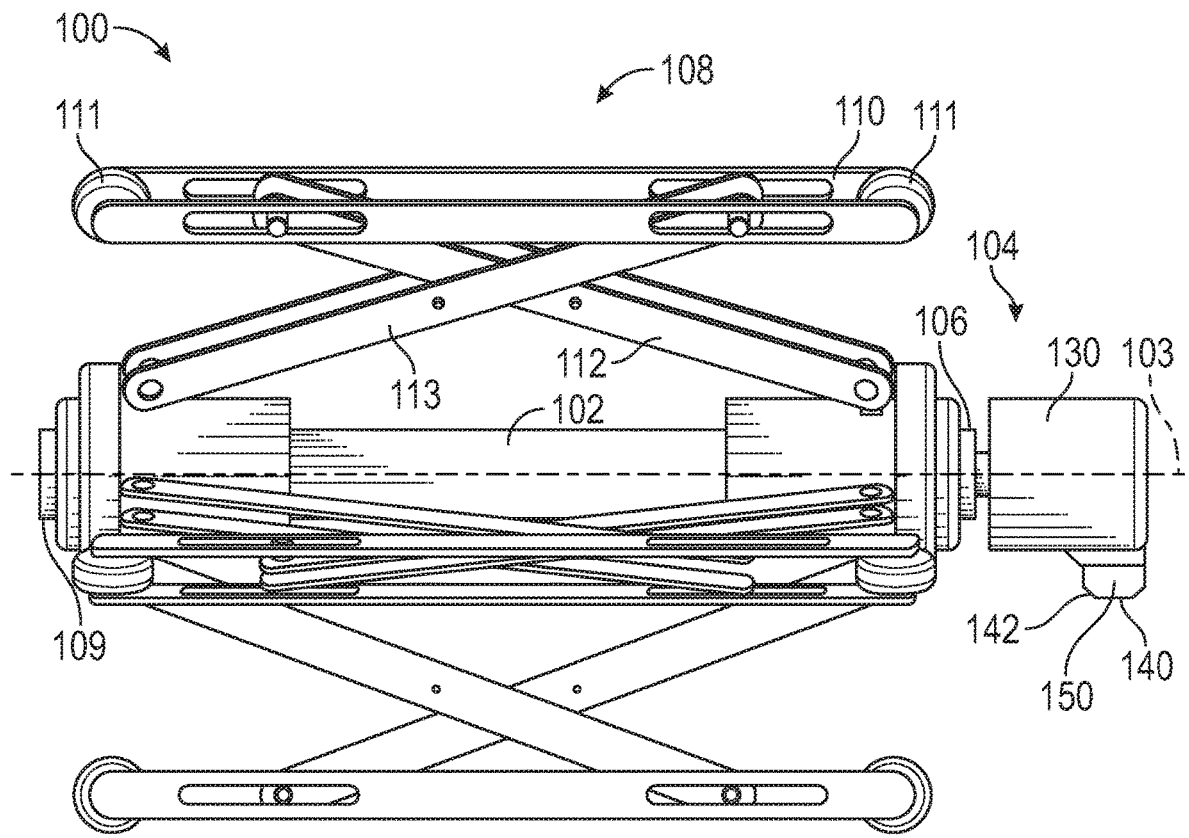
FIG. 1B illustrates a side view of the conduit mapping tool in an expanded configuration, according to an embodiment.

FIGS. 1A and 1B illustrate side views of a conduit mapping tool 100 in a collapsed configuration and in an expanded configuration, respectively, according to an embodiment. The conduit mapping tool 100 generally includes an elongated, central shaft 102 that extends longitudinally along a central axis 103, a sensor assembly 104 connected to a distal end 106 of the shaft 102, and a centralizer 108 that extends radially outward from the central shaft 102. A proximal end 109 of the shaft 102 may be configured to couple to a linear driver (e.g., an actuator), which may advance the tool 100 left-to-right (as depicted), axially into and out of a surrounding conduit, such as a drill pipe, collar, casing segment, etc., as will be described in greater detail below.

The centralizer 108 may be expandable radially between the collapsed and expanded configurations, as may be appreciated by comparing FIGS. 1A and 1B, so as to engage a range of different diameters in the surrounding conduit. A variety of different types of centralizers may be suitable. The illustrated centralizer 108 includes a plurality of sliders 110 which extend generally axially, parallel to the central shaft 102, and are configured to slide along the interior surface of a surrounding conduit, e.g., using rollers 111 at either axial end, as shown. In some embodiments, rollers 111 may be omitted. The sliders 110 may be pivotally coupled to a plurality of arms (or linkages) 112, 113 which may in turn be pivotally coupled to the central shaft 102. The arms 112, 113 may be biased so as to pivot outwards, away from the central shaft 102, thereby biasing the sliders 110 radially outwards and into engagement with the surrounding conduit (if present and within the operable range of motion for the centralizer 108). It will be appreciated that the centralizer 108 may also include other structures, such as wheels, rollers, springs, additional arms, more complex linkages, etc., to facilitate radial expansion, centralization, and/or moving along the surrounding structure.

In an embodiment, the sensor assembly 104 may be coupled to the distal end 106 (i.e., the end that is configured to advance first into the conduit) of the shaft 102. In some embodiments, the sensor assembly 104 may be coupled to the shaft 102 in another position, e.g., between the ends of the shaft 102. Further, the sensor assembly 104 may include a sensor module 130. The module 130 may be rotatably coupled to the shaft 102 such that the sensor module 130 is rotatable about the central longitudinal axis 103 of the shaft 102, with respect to the shaft 102. For example, the sensor module 130 may include a motor, e.g., an AC or DC motor with a rotary encoder to measure and output the angular position of the sensor module 130. In other embodiments, the shaft 102, or a portion thereof, may be rotated, and the module 130 may be positionally fixed thereto. The central shaft 102 may be rotatable or non-rotatable with respect to the centralizer 108.

The sensor module 130 may include one or more non-contact, linear displacement sensors, such as a laser triangulation sensor, a laser triangulation scanner, or a time-of-flight sensor. For example, the sensor module 130 may include a laser emitter 140 configured to emit a laser beam radially outwards, which may be at least partially reflected back by the surrounding structure, as will be described in greater detail below, to a sensor 142 of the sensor module 130. The sensor 142 may be an infrared (or another type of) photodetector configured to measure the location of the laser beam as it returns to the sensor 142. From this measurement, a distance the reflected laser beam travels may be calculated, thereby providing a radial distance measurement.

As illustrated in FIGS. 1A and 1B, the sensor 142 may be located near to, e.g., on the proximal side, of the emitter 140, such that the sensor 142 is between the emitter 140 and the proximal end 109 of the shaft 102. In other implementations, however, the sensor 142 may be located distally of the emitter 140. The sensor module 130 and its various components may be configured to measure distances from the sensor module 130 to specular surfaces, diffuse surfaces, or both.

The sensor assembly 104 may also be adjustable in the radial direction (i.e., perpendicular to the central axis 103). For example, the sensor assembly 104 may include a retractable head 150. The head 150 may be retracted radially inwards and/or extend radially outwards. The emitter 140 and/or sensor 142 may be connected to the head 150, such that the radial position thereof is adjustable along with the head 150. This may, for example, extend the range of diameters that may be measured by a given sensor module 130. The head 150 position may be recorded along with the distance measured by the sensor module 130, so as to thereby determine an actual distance from the central axis 103 or any other location of the sensor module 130.

Figure 2:
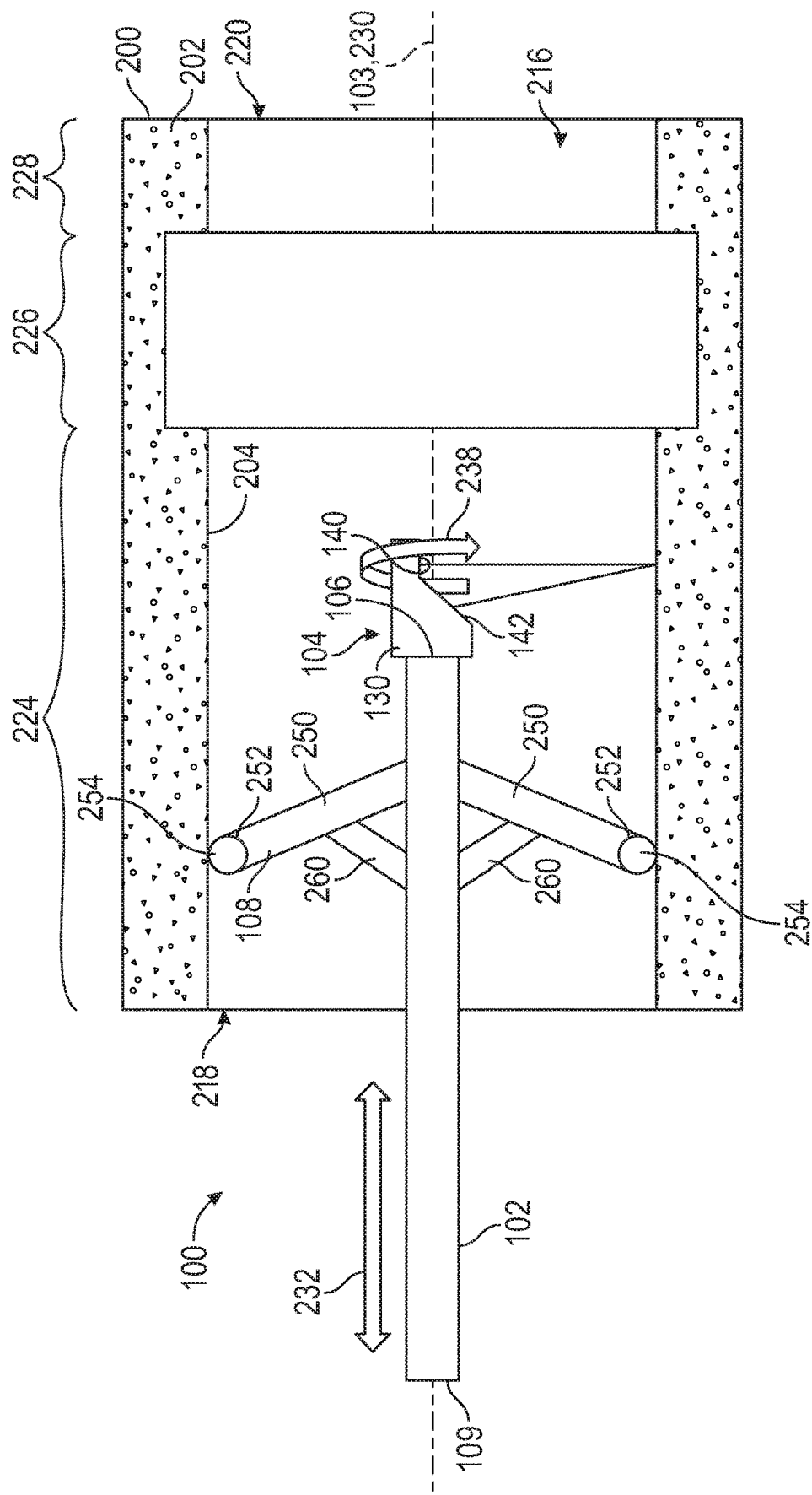
FIG. 2 illustrates a side, cross-sectional view of another embodiment of the conduit mapping tool extending into a conduit, according to an embodiment.

FIG. 2 illustrates a side, cross-sectional view of another embodiment of the conduit mapping tool 100 extending into a conduit 200, such as a pipe, according to an embodiment. The embodiment of the tool 100 of FIG. 2 may be generally similar to the embodiment of FIGS. 1A and 1B, and like numbers are used to denote like components and duplicative descriptions are omitted.

The conduit 200 includes a wall 202 that, on its inside, defines an inner diameter surface 204, which extends longitudinally through and along the axial length of the conduit 200. The conduit 200 may also define a first opening 218 at a first end of the conduit 200 and a second opening 220 at a second end of the conduit 200 opposite to the first opening 218. The inner surface 204 may extend between the first and second openings 218, 220, thus defining an axial throughbore 216 within the conduit 200. The surface 204 may be formed by any one of various suitable fabrication techniques, including various boring, milling, and/or machining techniques. The central longitudinal axis 103 of the shaft 102 may be coincident with a central longitudinal axis 230 of the conduit 200, and may be maintained coincident by operation of the centralizer 108.

In some implementations, the conduit 200 may include multiple distinct, generally cylindrical sections, which may have different diameters or profiles, and thereby define a multi-part or "complex" inner diameter profile. For example, a first section 224 of the conduit 200 adjacent to the first opening 218 may have a first diameter, a second section 226 of the conduit 200 adjacent to the first section 224 may have a second diameter that is larger or smaller than the first diameter, and a third section 228 of the conduit 200 may have a third diameter that is larger than, smaller than, or the same as the first and/or the second diameters. In the example illustrated in FIG. 2, the first diameter of the first section 224 is the same as the third diameter of the third section 228, both of which are smaller than the second diameter of the second section 226, such that radial steps are formed in the surface 204 at the locations where the first, second, and third sections 224, 226, and 228 meet one another. Thus, the second section 226 forms a channel in the surface 204 of the wall 202 that extends circumferentially around the surface 204 of the wall 202.

In various other implementations, the inner surface 204 may have many distinct sections with various distinct profiles. For example, the inner surface 204 may include channels, grooves, ridges, and expanding or contracting portions, depending on the end use (e.g., drill pipe, drill collar, etc.) and specific design of the pipe. Further, the inner surface 204 may have defects or surface roughness, or may be chamfered, skewed, or out of alignment, as a result of the fabrication techniques used to form the inner surfaces.

Further, the inner surface 204 may have a degree of ovality, and thus may not be perfectly circular. In some cases, the precise dimensions of the inner surfaces of pipes may not be sufficiently accurately known once they are fabricated.

In operation, the conduit mapping tool 100 may be used to measure and map the inner surface 204. In particular, the shaft 102 may be actuated at its first, proximal end 109 to translate longitudinally into and out of the conduit 200 along the central axis 230, as indicated by arrow 232. For example, the shaft 102 may be actuated by a linear actuator, and a linear encoder may be used to measure and output the linear position of the tool 100 (particularly the sensor module 130) relative to the conduit 200, such as to within a precision of, for example, between about 0.010 mm, about 0.015 mm or about 0.1 mm to about 0.2 mm, about 0.25 mm, or about 0.30 mm.

The sensor 142 of the sensor module 130 may measure the distance from the sensor module 130 to the surface 204 of the conduit 200. By taking such measurements while rotating the sensor module 104 with respect to the conduit 200, about the central axis 103 (and/or 230), as indicated by arrow 238, the sensor module 130 may be used to measure a complete 360° contour or profile of the surface 122 around the axis 103. Further, by taking such measurements while translating the sensor module 130 longitudinally into and out of, or with respect to, the conduit 200 (i.e., along the central axis 230), the sensor module 130 may be used to measure the longitudinal contour or profile of the surface 204 along the axis 230.

FIG. 2 also illustrates another embodiment of the centralizer 108 of the tool 100. Similar to the embodiment of FIG. 1, the centralizer 108 includes arms 250, which may be or include bars that are pivotally coupled (e.g., hinged) to the shaft 102, such as at the same position along the shaft 102. Further, the arms 250 may be rotatably coupled at respective second ends 252 of the arms 250 to respective wheels 254 that may roll along the inner surface 204 of the conduit 200. In some embodiments, the wheels 254 may be omitted, and the arms 250 may slide against the inner surface 204 and/or sliders or other elements may be provided. Two arms 250 are illustrated, but in various implementations, any suitable number of arms 250 may be used. As examples, the centralizer 108 may include three arms 250 spaced radially about the axis 103 at 120° apart from one another, four arms 250 spaced radially about the axis 103 at 90° apart from one another, five arms 250 spaced radially about the axis 103 at 72° apart from one another, etc. The arms 250 may extend radially outward from the shaft 102 and proximally toward the first, proximal end 109 of the shaft 102, as they extend outward from the shaft 102.

The tool 100 may also include linkages 260, which may be or include bars that are pivotally coupled (e.g., hinged) at respective first ends of the linkages 260 to the shaft 102 at a location proximal to the arms 250, such as at the same position along the central longitudinal axis 102 as one another, and that are pivotally coupled at respective second ends of the linkages 260 to respective ones of the arms 250 near the respective midpoints of the arms 250. Two linkages 260 are illustrated in FIG. 2, one for each of the illustrated arms 250, but in various implementations, any suitable number of linkages, which may match the number of arms 250, may be used. The linkages 260 may extend radially outward from the shaft 102 and distally away from the first, proximal end 109 of the shaft 102, as the linkages 260 extend outward from the shaft 102 and toward the respective arms 250.

The linkages 260 may include springs or other mechanisms so that their respective lengths are biased towards expansion. For example, a portion of each of the linkages 260 may include a spring (e.g., a coil spring or a bow spring) in compression so that the first ends of the linkages 260 are biased away from the respective second ends of the linkages 260. Thus, the linkages 260 may act to bias the respective arms 250 to rotate outward from the shaft 102 and toward the second, distal end 106 of the shaft 102, until the respective wheels 254 engage with the surface 204 of the conduit 200. In some cases, the linkages 260 and the arms 250 may be restrained, mechanically or electronically, so that each of the wheels 234 are located at equal distances from the shaft 102, to assist in keeping the shaft 102 aligned with the central longitudinal axis 230 of the conduit 200. In other cases, the linkages 260 and the arms 250 may be unrestrained in this sense, so that the wheels 254 may be located at different distances from the shaft 102, to provide the mapping tool 100 with greater flexibility.

In other implementations, or in addition, the mapping tool 100 may include arms that extend radially outward from the shaft 102 and distally toward the second, distal end 106 of the shaft 102, as they extend outward from the shaft 102, and linkages that bias such arms to rotate toward the first, proximal end 109 of the shaft 102.

Figure 3:
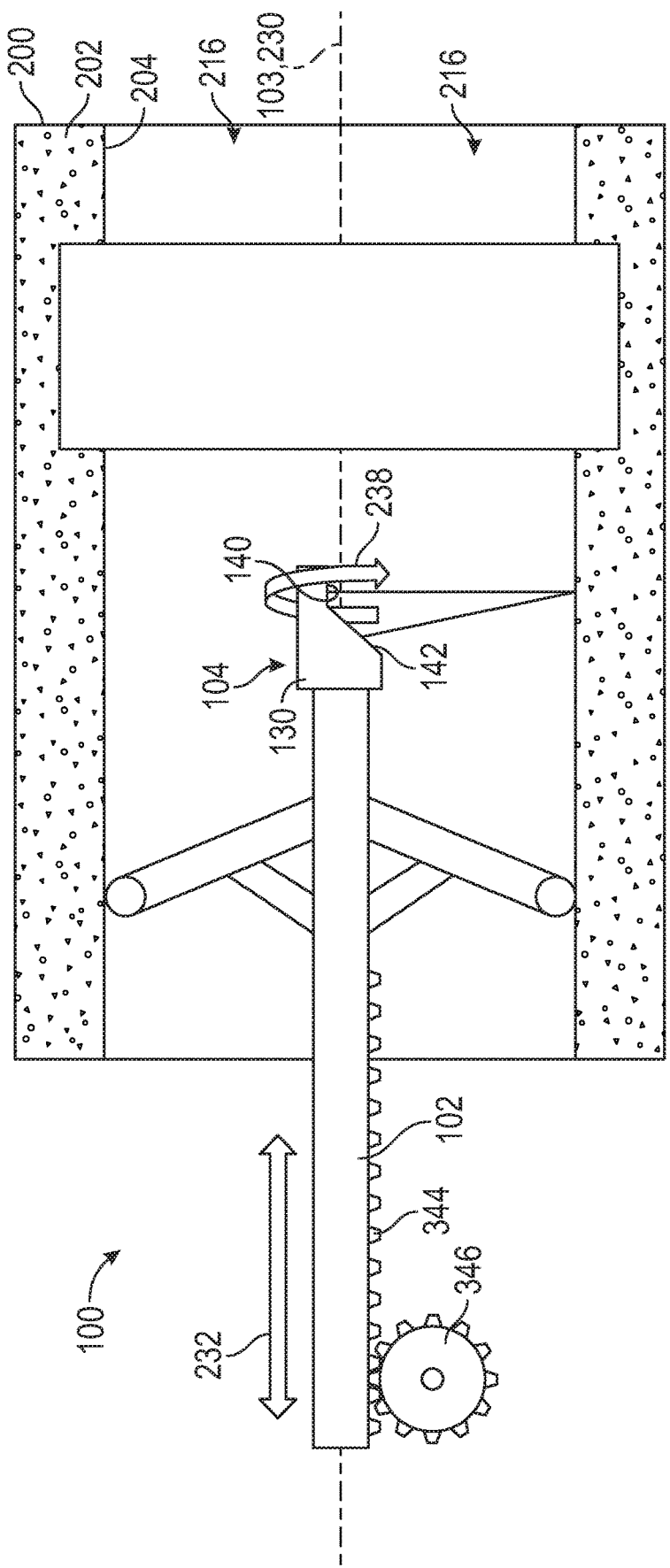
FIG. 3 illustrates a side, cross-sectional view of the mapping tool combined with a rack and pinion actuation mechanism, according to an embodiment.

FIG. 3 illustrates a side, cross-sectional view of the mapping tool 100 combined with a rack and pinion actuation mechanism, according to an embodiment. As shown, the shaft 102 may include teeth 344 meshed with the teeth of a gear 346. An operator may actuate the gear 346 to rotate so that the teeth of the gear 346 engage the teeth 344 and cause the mapping tool 100, including the shaft 102 and the sensor module 130, to travel in either direction longitudinally along the axis 230 and through the conduit 200. Another, similar implementation, may include a screw-drive.

Figure 4:
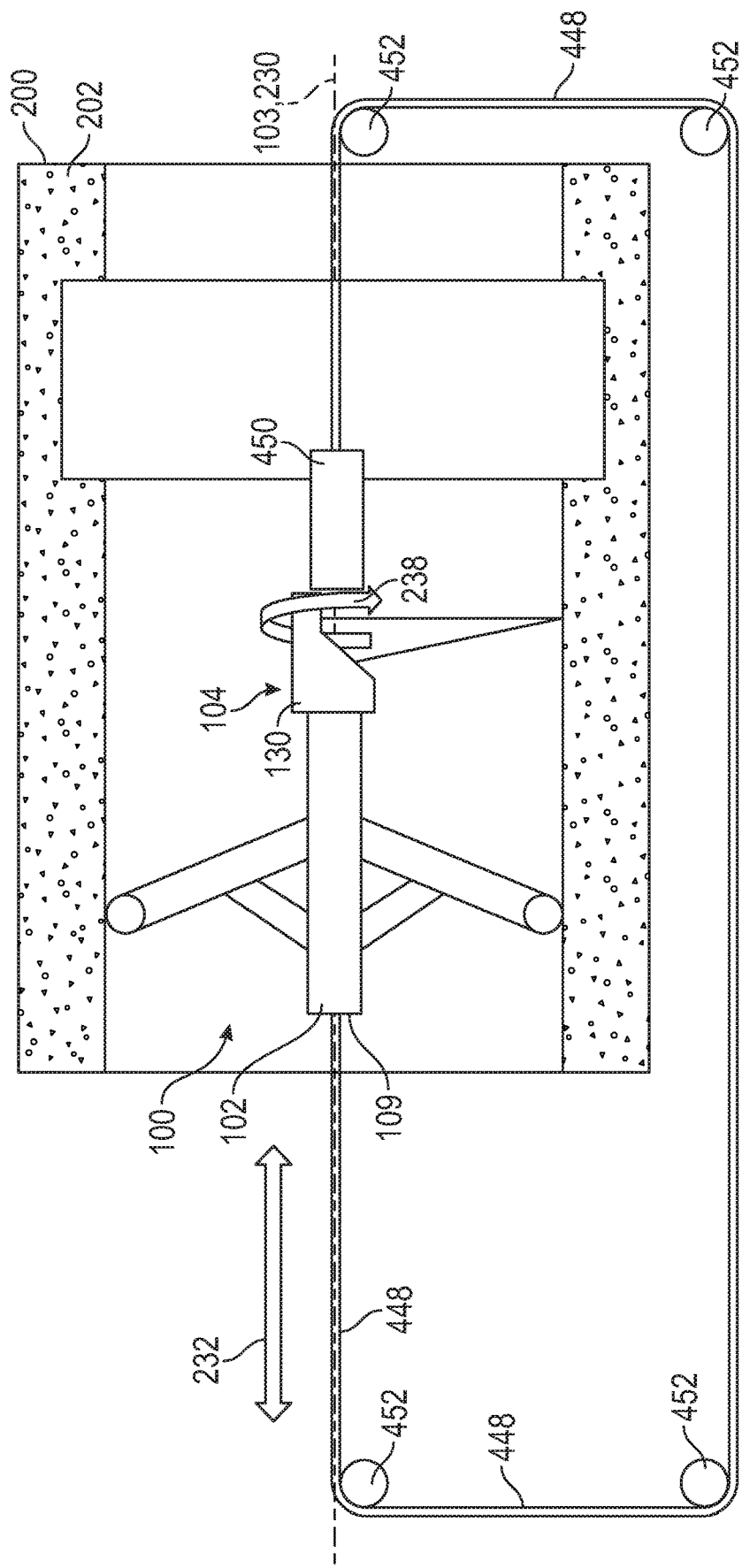
FIG. 4 illustrates a side, cross-sectional view of the mapping tool combined with a cable actuation mechanism, according to an embodiment.

FIG. 4 illustrates a side, cross-sectional view of the mapping tool 100 combined with a cable actuation mechanism, according to an embodiment. As shown, the shaft 102 may be coupled at its proximal end 109 to a first end of a cable 448, and the sensor module 130 may be coupled at its distal end to a distal shaft 450 that is coupled at its own distal end to a second end of the cable 448 opposite to the first end of the cable 448. The cable 448 may extend from its first end at the proximal end 109 of the shaft 102, around routing points at a plurality of pulleys or mandrels 452, to its second end at the distal end of the distal shaft 450. An operator may apply tension to the cable 448 and may maintain the cable 448 in a taut state so that the shaft 102 is maintained in alignment with the axis 103. The operator may further actuate the cable 448 to pull the mapping tool 100, including the shaft 102 and the sensor module 130, in either direction longitudinally along the axis 103 and through the conduit 200.

Figure 5:
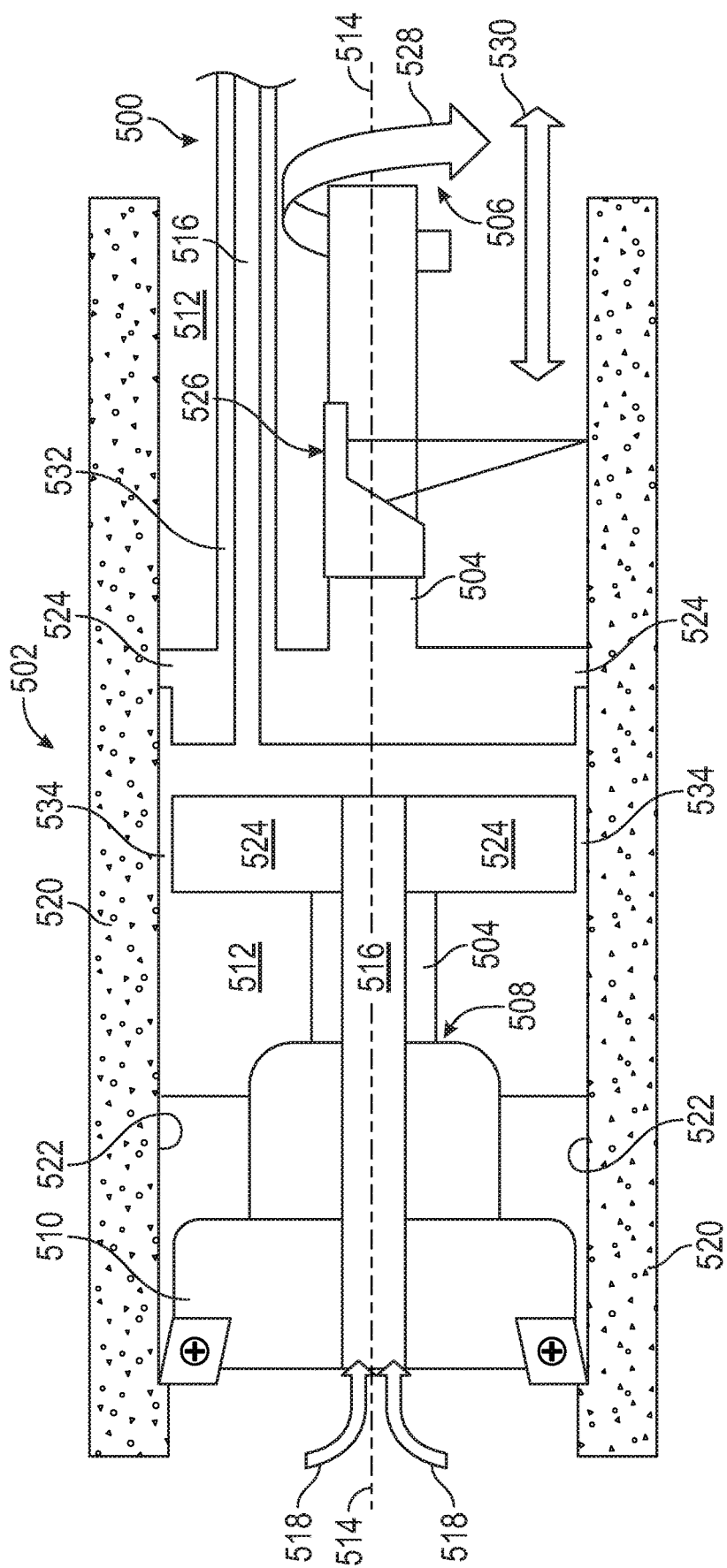
FIG. 5 illustrates a side, cross-sectional view of a conduit boring system extending into a conduit, according to an embodiment.

FIG. 5 illustrates a side, cross-sectional view of a conduit boring system 500 extending into a conduit 502, according to an embodiment. The boring system 500 includes a hollow, rigid, central shaft 504 that extends from a first location outside the conduit 502 at a proximal end 506 of the shaft 504 to a second location inside the conduit 502 at a distal end 508 of the shaft 504. The boring system 500 also includes a bore head 510 configured to cut material away from the pipe 502 to form a bore 512 through the conduit 502. The conduit 502 and the bore 512 may be concentric with one another so that they share a common central longitudinal axis 514.

The boring system 500 also includes a cleaning system 524, which is described further below, and a waste shaft 532 that extends proximally from the cleaning system 524 out of the conduit 502 along an axis that is parallel to and spaced apart from, that is, not coincident with, the longitudinal axis 514. The boring system 500 also includes a waste channel 516 that extends from a front or distal end of the bore head 510, through and along the length of the central shaft 504 to the cleaning system 524, radially outward through the cleaning system 524 to the waste shaft 532, and proximally along the waste shaft 532. The waste channel 516 may carry cuttings, debris, or any waste materials resulting from operation of the bore head 510 proximally through the bore 512 and out of the conduit 502, as indicated by arrows 518.

As the boring system 500 cuts the bore 512 through the conduit 502, the system 500 leaves an annular wall 520 surrounding (and defining) the bore 512. The wall 520 has an inner surface 522, which is also an outer surface of the bore 512. The boring system 500 also includes the cleaning system 524 coupled to the central shaft 504 behind, or proximally of, the bore head 510, which is configured to clean the inner surface 522 of the pipe wall 520 behind, or proximally of, the bore head 510. The cleaning system 524 may use compressed air, cutting fluid, or other fluids to remove additional cuttings, debris, or any waste materials not already passed out of the conduit 502 through the waste channel 516, and that remain on the surface 522 of the wall 520. For example, the cleaning system 524 may include a peripheral channel 534 that extends circumferentially around the exterior of the front or distal end of the cleaning system 524, and that is coupled to the waste channel 516. A vacuum may be drawn on the waste channel 516 to draw waste materials from in front of the bore head 510, and from the surface 522 behind the bore head 510, along the waste channel 516 and out of the system 500. Such waste materials may be fed into the waste channel 516 for removal and disposal during the boring operations. Thus, the cleaning system 524 may prepare the surface 522 of the wall 520 for measurement or mapping operations.

The boring system 500 also includes a non-contact linear displacement sensor module 526, which may be rigidly mounted to the central shaft 504, and which may include any features described above for the sensor module 130 and/or others. Thus, the sensor module 526 may be used to measure or map the surface 522 as described above, during boring operations. The waste shaft 532 may be positioned radially outward of the sensor module 526, and the sensor module 526 may be oriented such that the waste shaft 532 is behind the sensor module 526, so that the waste shaft 532 does not interfere with the operation of the sensor module 526 during mapping operations. The boring system 500 is also mounted to actuators at the proximal end 506 of the central shaft 504, so that the boring system 500, including the central shaft 504, the bore head 510, and the sensor module 526, may be actuated to rotate within the bore 512 and with respect to the conduit 502, as indicated by arrow 528, and to translate within the bore 512 and with respect to the conduit 502, as indicated by arrow 530. Such actuators may be used in combination with the bore head 510 and the cleaning system 524 to maintain the boring system 500, including the bore head 510, the central shaft 504, and the sensor module 526, at locations positioned concentrically with the central longitudinal axis 514 of the conduit 502 and the bore 512.

Such actuators may be controlled by a boring controller configured to control movement of the boring system 500 and its sensor module 526. The boring system 500 may also include a vibration dampener at its proximal end 506, to reduce the interference of any mechanical vibrations from the actuators with the operation of the sensor module 526. In some implementations, the sensor module 526 may be used in combination with other laser sensors, air gages, or dial gages coupled to the boring system 500 proximal to the bore head 510 and proximal to the cleaning system 524.

Figure 6:
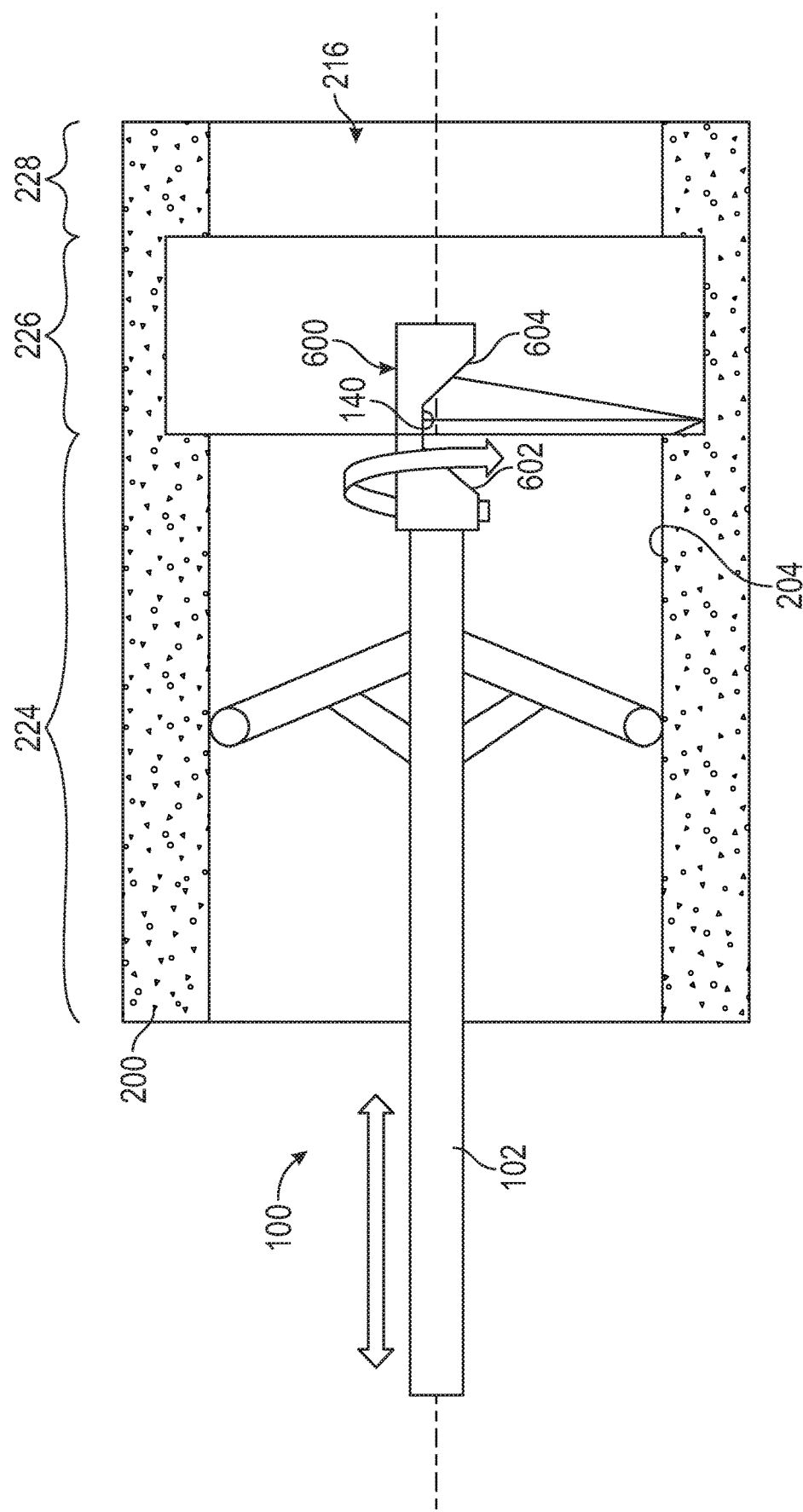
FIG. 6 illustrates a side, cross-sectional view of the mapping tool extending into the conduit, according to an embodiment.

FIG. 6 illustrates a side, cross-sectional view of the mapping tool 100 extending into the conduit 200, according to an embodiment. In this embodiment, the mapping tool 100 includes a dual-sensor module 600 having a first photodetector 602 positioned proximally of the laser emitter 140 and a second photodetector 604 positioned distally of the emitter 140. Measurements may be difficult to obtain in the region of a step in the radius of the inner surface 204 of the conduit 200 by a single sensor located proximally or distally of the laser device generating the laser beam. The dual-sensor module 600 may address these difficulties by providing photodetectors both proximally and distally with respect to the emitter 140, so that the dual-sensor module 600 includes a dual laser triangulation sensor or a dual laser triangulation scanner. In some cases, the dual-sensor module 600 is able to obtain measurements using both of its photodetectors, in which case, the measurements from both photodetectors may be used, such as by averaging, to improve overall accuracy of the measurements.

Figure 7:
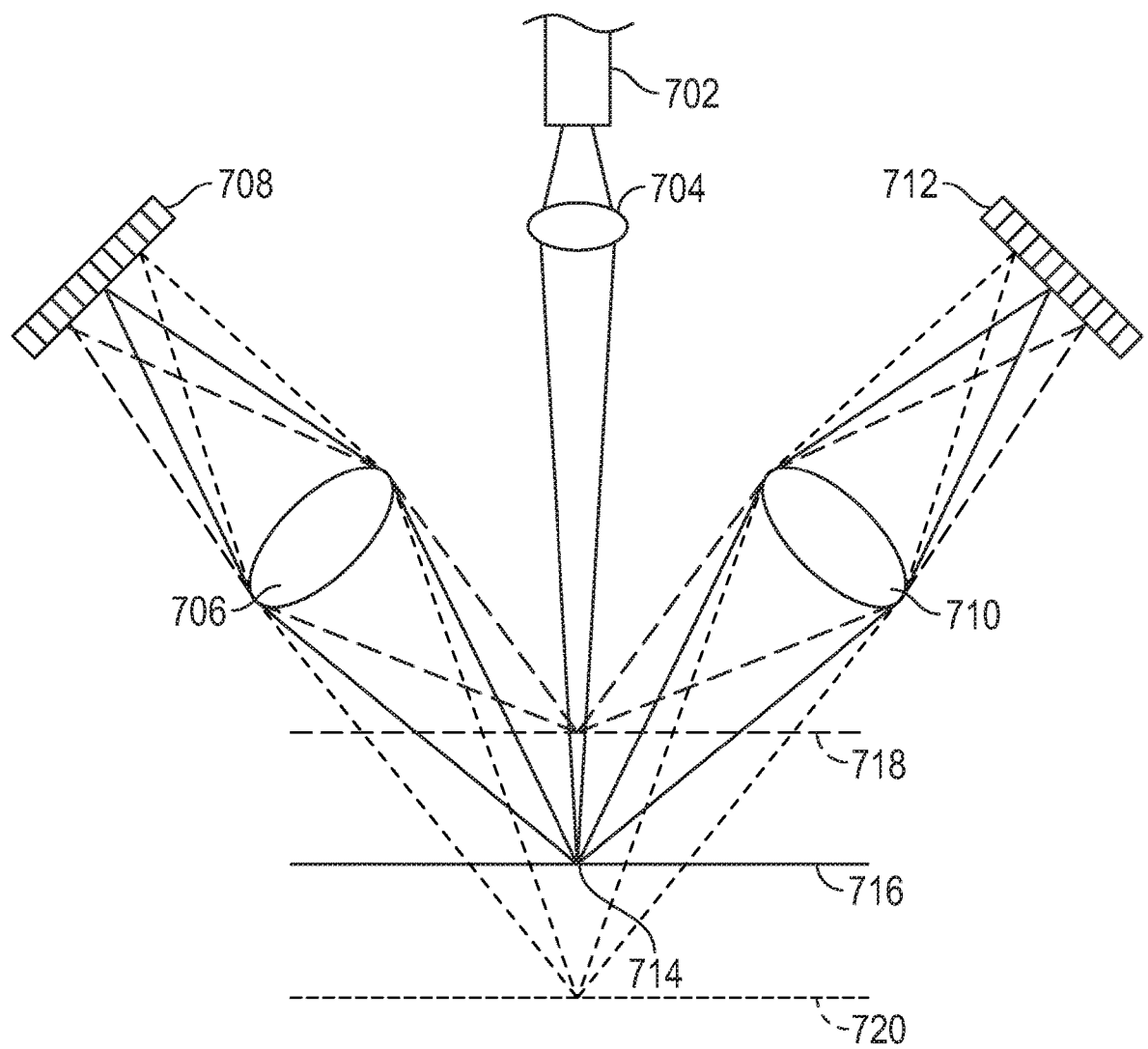
FIG. 7 illustrates optical geometry for such a dual-laser triangulation sensor or dual-laser triangulation scanner of a dual-sensor module, according to an embodiment.

FIG. 7 illustrates optical geometry for such a dual-laser triangulation sensor or dual-laser triangulation scanner of a dual-sensor module, according to an embodiment. The dual-sensor module may be an embodiment of the dual-sensor model 600 of FIG. 6. As shown in FIG. 7, the dual-sensor module includes a laser (or another type of light) device or emitter 702, a focusing lens 704, a first imaging lens 706 and a first photodetector 708 positioned proximal to the laser emitter 702 and focusing lens 704, and a second imaging lens 710 and a second photodetector 712 positioned distal to the laser emitter 702 and focusing lens 704. The emitter 702 may generate and emit a laser beam that extends toward the focusing lens 704, where it is focused toward a focal point 714 lying on a target plane 716. The surface 204 may lie on the target plane 716, or on a second plane 718 closer to the laser emitter 702 than the target plane 716, or on a third plane 720 farther from the laser emitter 702 than the target plane 716. In any case, the beam of light may be diffusely and symmetrically reflected from the surface 204, so that at least a portion of the beam of light is reflected toward the first imaging lens 706 and so that at least a portion of the beam of light is reflected toward the second imaging lens 710. The first and second imaging lenses 706 and 710 may focus this diffusely reflected light toward the respective photodetectors 708 and 712, such as toward focal points lying in the plane of the photodetectors 708 and 712.

In the configuration illustrated in FIG. 7, the closer the surface 204 is to the laser emitter 702, the more proximal the imaged spot will be on the first photodetector 708, and the more distal the imaged spot will be on the second photodetector 712. Similarly, the farther the surface 204 is from the laser emitter 702, the more distal the imaged spot will be on the first photodetector 708, and the more proximal the imaged spot will be on the second photodetector 712. Thus, the measurements recorded by the first and second photodetectors 708 and 712 may be symmetric in this regard. Based on the measurements taken at the photodetectors 708 and 712 and the established geometry of the system, the distance from the dual-sensor module to the surface (e.g., the surface 204, as shown in FIG. 6) may be calculated. The components and geometry illustrated in, and described with respect to, FIG. 7 may be used in any of the sensor modules described herein.

In some implementations, a mapping system may include multiple interchangeable sensor modules. For example, as noted above, the dual-sensor module 700 focuses light to a focal point 714 lying on a target plane 716. A distance between the laser emitter 702 and the target plane 716 may be referred to as a focal length, and any of the mapping systems described herein may include a plurality of interchangeable sensor modules wherein each sensor module has a different respective focal length. Before operation of such a mapping system is initiated, an inside diameter or an average or nominal inside diameter of a conduit to be mapped may be determined, and one of the sensor modules having a focal length that most closely approximates one half of the determined diameter may be selected from the plurality of sensor modules for use with the mapping system. The selected sensor module may then be coupled to the rest of the mapping system and the mapping operation may be initiated.

Similarly, a mapping system may include multiple interchangeable sets of arms or other devices configured to maintain the alignment of the mapping system with the central longitudinal axis of the conduit to be mapped. For example, any of the mapping systems described herein may include a plurality of interchangeable sets of arms wherein each set of arms is configured to maintain the alignment of the mapping system with the central longitudinal axis of a conduit having a different respective inside diameter or average or nominal inside diameter. Before operation of such a mapping system is initiated, an inside diameter or an average or nominal inside diameter of a conduit to be mapped may be determined, and one of the sets of arms most closely configured for operation in a conduit having the determined diameter may be selected for use with the mapping system. The selected set of arms may then be coupled to the rest of the mapping system and the mapping operation may be initiated.

Once mapping operations have been initiated, data collected from the sensor module and the mapping system may be fit to a circular pattern and stored in a cylindrical coordinate system. The data may be collected to create a three-dimensional model of the conduit, such as a three-dimensional point cloud model or a CAD model. Such models may be compared to or overlaid with models of the conduit as it was designed, to evaluate consistency and precision of the processes used to manufacture the conduit. Such models may also be used to determine geometric dimensioning and tolerance (referred to as GD&T) values for the conduit.

The sensor modules and the mapping systems described herein may be used to measure or map the dimensions of conduits having an inside diameter, or an average or nominal inside diameter, from at least 40 mm to at least 150 mm, with precision of at least 50 μm. The sensor modules and mapping systems described herein may also be used to measure or map the entirety of a conduit that extends through a pipe up to twelve meters long.

Figure 8:
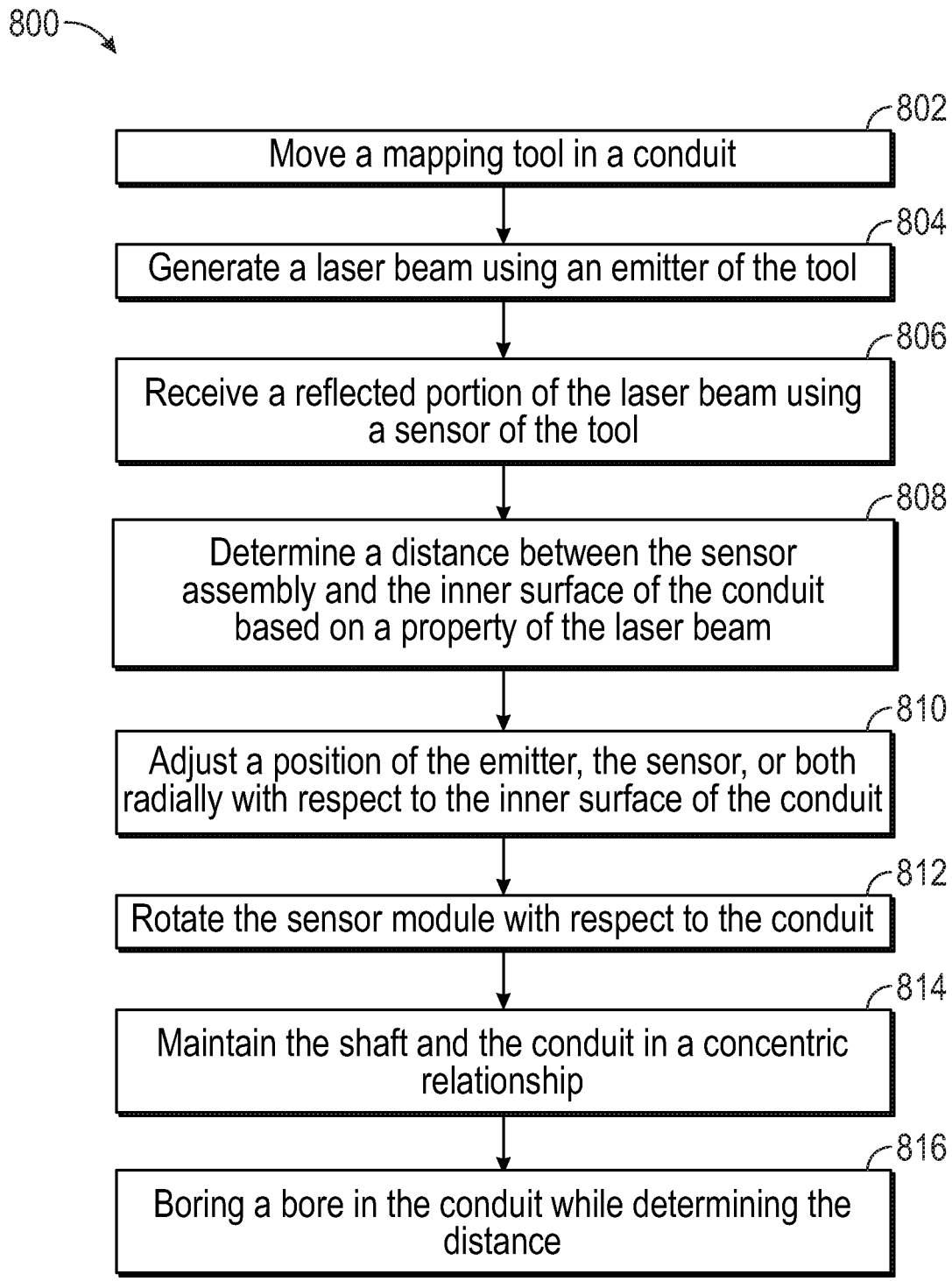
FIG. 8 illustrates a flowchart of a method for mapping a conduit, according to an embodiment.

FIG. 8 illustrates a flowchart of a method 800 for mapping a conduit, according to an embodiment. The method 800 may include moving a mapping tool 100 at least partially in the conduit 200, as at 802. The mapping tool 100 may be or be similar to any of the mapping tool embodiments discussed above, or others. The method 800 may also include generating a laser beam using an emitter 140 of the tool 100, where the laser beam is directed toward the inner surface 204 of the conduit 200, as at 804. The method 800 may further include receiving at least a portion of the laser beam reflected by the surface 204 at a sensor (e.g., photodetector) 142 of the tool 100, as at 806. The method 800 may further include determining a distance between the sensor module 130 and the inner surface 204 of the conduit 200 based on a property (e.g., angle of incidence, time of flight, etc.) of the laser beam, as at 808.

In some embodiments, the method 800 may also include adjusting a position of the emitter 140, the sensor 142, or both radially with respect to the inner surface 204 of the conduit 200 by retracting or expanding a head 150 of the sensor module 130, as at 810.

In some embodiments, the method 800 may also include rotating the sensor module 130 about the central longitudinal axis 103 while moving the mapping tool 100 in the conduit 200, as at 812.

In some embodiments, the conduit 200 may define a central longitudinal axis 230, and the method 800 may also include maintaining the central longitudinal axis 103 of the shaft 102 coincident with the central longitudinal axis 230 of the conduit 200 using the centralizer 108, as at 814. That is, the shaft 102 and the conduit 200 may be held generally concentric.

In some embodiments, the mapping tool 100 may be coupled to a bore head 510, and the method 800 may further include boring a bore 512 in the conduit 502 while determining the distance, as at 816.

Figure 9:
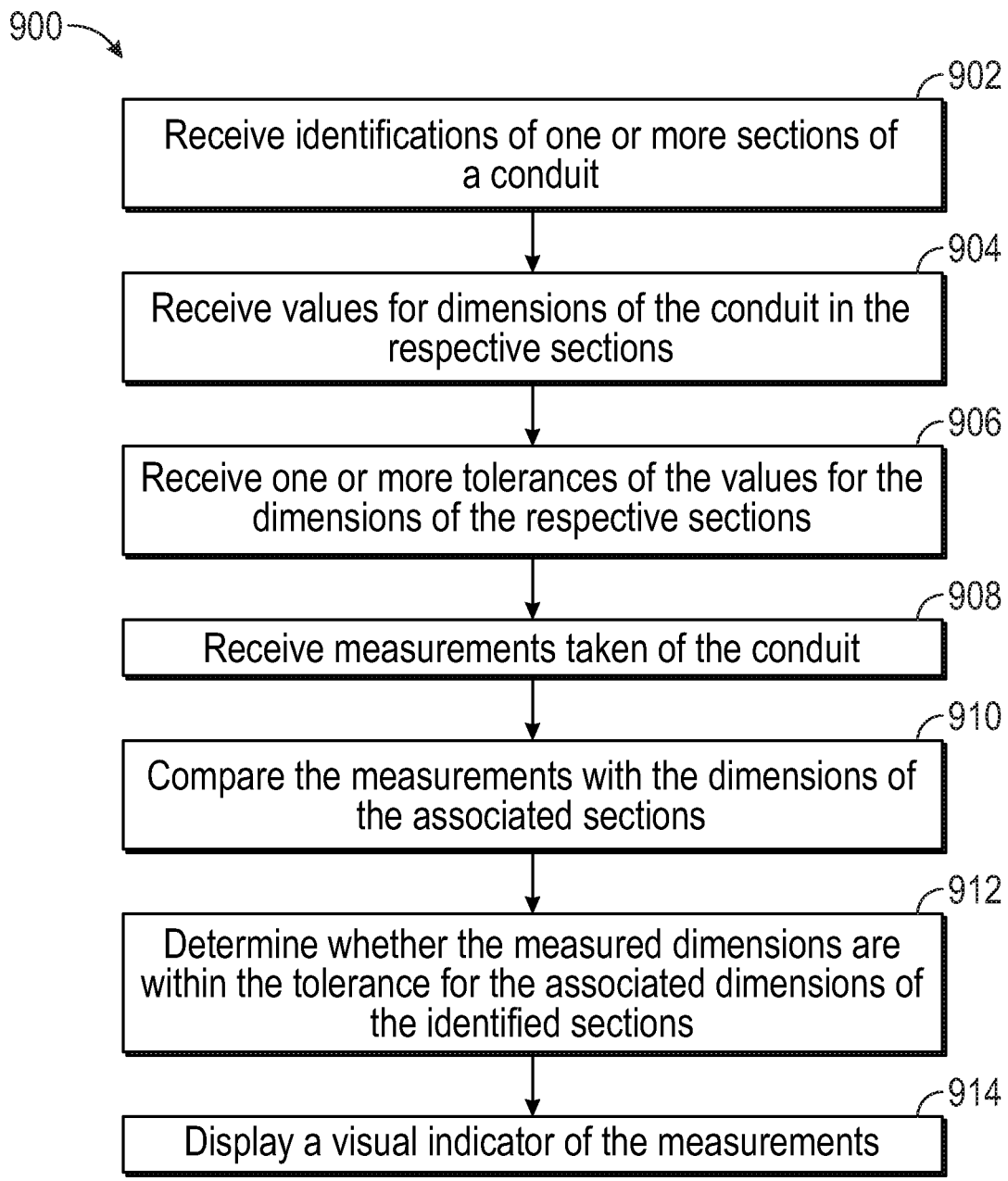
FIG. 9 illustrates a flowchart of a method for measuring a conduit, according to an embodiment.

FIG. 9 illustrates a flowchart of a method 900 for measuring a conduit, according to an embodiment. The method 900 may proceed at least in part by operation of the tool 100 in the conduit 200, and is thus described herein with reference thereto; however, it will be appreciated that some embodiments of the method 900 may employ other tools.

The method 900 may include receiving identifications of one or more sections 224, 226, 228 (see, e.g., FIG. 6) of the conduit 200, as at 902. The method 900 may also include receiving values for dimensions of the conduit 200 in the respective sections 224, 226, 228 (e.g., a diameter for each identified section 224, 226, 228), as at 904. The method 900 may further include receiving one or more tolerances associated with the dimensions of the conduit 200 in the respective sections 224, 226, 228, as at 906.

The method 900 may then include receiving measurements taken of the conduit 200, e.g., using the tool 100, as at 908. For example, receiving the measurements at 908 may include determining a measurement corresponding to the dimension for the section 224, 226, 228 based on the distance from the sensor head to the inner surface of the conduit that was determined, as discussed above, e.g., with reference to FIG. 8 at 808.

The measurements may then be compared with the values for the identified sections 224, 226, 228, as at 910. The method 900 may include determining whether the measurements are within the tolerance of the received values for the associated dimensions, as at 912. A measurement may be considered to be within the tolerance if it is greater than the received dimension by less than the upper tolerance or less than the received dimension by less than the lower tolerance ($d-t_1 < x < d+t_u$; where d is the nominal/received dimension, $t_1$ is the lower tolerance, $t_u$ is the upper tolerance, and x is the measured value).

The method 900 may then include displaying a report of the collar dimensioning in the various sections 224, 226, 228, e.g., as a visual pass/fail report or indicator, as at 914. For example, if a dimension of a section measured at 908 is within the range of tolerances from the dimension that is input at 904, the report may indicate that the profile of the conduit 200 in this section passes, and fails otherwise. In response to a failure, a user may, for example, re-profile one or more sections of the conduit 200, discard the conduit 200, or take any other appropriate remedial actions.

A few example embodiments have been described in detail above; however, those skilled in the art will readily appreciate that many modifications are possible in the example embodiments without materially departing from the scope of the present disclosure or the appended claims. Accordingly, such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scope of the disclosure and the appended claims. Additions, deletions and modifications to the embodiments that fall within the meaning and scopes of the claims are to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, or the combination of any two upper values are contemplated. Certain lower limits, upper limits and ranges may appear in one or more claims below. Numerical values are "about" or "approximately" the indicated value, and take into account experimental error, tolerances in manufacturing or operational processes, and other variations that would be expected by a person having ordinary skill in the art.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include other possible embodiments along with the full scope of equivalents to which such claims are entitled. Accordingly, the claims are not limited by the disclosure.

What is claimed is:

1. An apparatus for mapping a conduit wall, comprising:
   a shaft defining a central longitudinal axis;
   a sensor module coupled to the shaft, and including:
      an emitter configured to emit a light beam directed at least partially radially with respect to the central longitudinal axis; and
      a sensor configured to detect a reflected portion of the light beam, such that the sensor module is configured to measure a distance between the conduit wall and sensor module; and
   a centralizer coupled to the shaft and configured to position the sensor module at a center of the conduit.

2. The apparatus of claim 1, wherein the sensor module is rotatable about the central longitudinal axis.

3. The apparatus of claim 1, wherein the sensor module is rotatable with respect to the shaft.

4. The apparatus of claim 1, wherein the centralizer is configured to slide or roll against the conduit wall.

5. The apparatus of claim 1, wherein the sensor module comprises a retractable head configured to move radially closer to and away from the central longitudinal axis, and wherein the emitter, the sensor, or both are coupled to the retractable head so as to move therewith.

6. The apparatus of claim 1, further comprising a linear actuator coupled to a proximal end of the shaft, to move the shaft along the central longitudinal axis.

7. The apparatus of claim 6, wherein the sensor module is coupled to a distal end of the shaft.

8. The apparatus of claim 7, wherein the sensor is a first photodetector located closer to the proximal end of the shaft than the emitter, and wherein the sensor module further includes a second photodetector configured to receive at least a reflected portion of the light beam, the second photodetector being located closer to the distal end of the shaft than the emitter.

9. A system for forming and mapping a conduit wall, comprising:
   an elongate shaft having a proximal end, a distal end, and a central longitudinal axis extending from the proximal end to the distal end;
   a bore head coupled to the distal end of the elongate shaft, wherein the bore head is configured to remove material from the conduit wall; and
   a sensor module coupled to the elongate shaft, the sensor module including a laser device oriented so as to emit a laser beam that extends radially away from the central longitudinal axis, and the sensor module including a photodetector oriented to receive at least a reflected portion of the laser beam.

10. The system of claim 9, further comprising a cleaning system coupled to the elongate shaft between the bore head and the sensor module.

11. The system of claim 9, wherein the laser device is oriented to emit the laser beam perpendicularly with respect to the central longitudinal axis.

12. The system of claim 9, further comprising a linear actuator coupled to the elongate shaft to move the elongate shaft along the central longitudinal axis.

13. The system of claim 9, further comprising a rotary actuator coupled to elongate shaft to rotate the elongate shaft about the central longitudinal axis.

14. The system of claim 9, wherein the sensor module is rotatably coupled to the elongate shaft.

15. The system of claim 9, wherein the photodetector is a first photodetector located closer to the proximal end of the elongate shaft than the laser device, and the sensor module includes a second photodetector oriented to receive at least another reflected portion of the laser beam, the second photodetector located closer to the distal end of the elongate shaft than the laser device.

16. A method of mapping a conduit, comprising:
   moving a mapping tool at least partially in the conduit, the mapping tool comprising:
      a shaft defining a central longitudinal axis;
      a sensor module coupled to the shaft, the sensor module including a laser emitter and a photodetector; and
      a centralizer coupled to the shaft and configured to position the sensor module at a center of the conduit;
   generating a laser beam using the laser emitter, wherein the laser beam is directed toward an inner surface of the conduit;
   receiving at least a portion of the laser beam reflected by the inner surface of the conduit at the photodetector; and
   determining a distance between the sensor module and the inner surface of the conduit based on a property of the laser beam.

17. The method of claim 16, further comprising adjusting a position of the emitter, the photodetector, or both radially with respect to the inner surface of the conduit by retracting or expanding a head of the sensor module.

18. The method of claim 16, further comprising rotating the sensor module about the central longitudinal axis while moving the mapping tool in the conduit.

19. The method of claim 16, wherein the conduit defines a central longitudinal axis and the method further comprises maintaining the central longitudinal axis of the shaft coincident with the central longitudinal axis of the conduit using the centralizer.

20. The method of claim 16, further comprising:
   receiving a value for a dimension for a section of the conduit;
   receiving a tolerance for the dimension;
   determining a measurement corresponding to the dimension for the section based on the distance from the sensor head to the inner surface of the conduit that was determined; and
   determining whether the measurement is within the tolerance for the dimension.

* * * * *